United States Patent Office 3,189,663
Patented June 15, 1965

3,189,663
BLOCK COPOLYMERS
Kenzie Nozaki, El Cerrito, Calif., assignor to Shell Oil Company, New York, N.Y., a corporation of Delaware
No Drawing. Filed June 22, 1961, Ser. No. 118,771
13 Claims. (Cl. 260—879)

This invention relates to new block copolymers and their preparation. More particularly, the invention relates to new block copolymers prepared from polymers of certain unsaturated acids, and their derivatives to the preparation of the block copolymers and their utilization.

Specifically, the invention provides new and particularly valuable block copolymers comprising copolymers wherein the macromolecules are made up of at least two different linear segments joined in an end to end arrangement, the first segment being made up of a linear polymer of a member of the group consisting of ethylenically unsaturated carboxylic acids, anhydrides thereof, their esters and amides, and the other segment being made up of a polymer of at least one monomer selected from the group consisting of a dissimilar member of the aforementioned group, esters of unsaturated alcohols and saturated carboxylic acids, alkenes, alkadienes, vinyl halides, vinylidene halides, ethylenically unsaturated nitriles, alkenyl-substituted aromatic hydrocarbons, alkenyl-substituted halo-hydrocarbon and alkenyl ethers.

This application is a continuation-in-part of my application Ser. No. 566,774, filed February 21, 1956 now U.S. Patent No. 2,991,269, which in turn is a continuation-in-part of application Serial No. 270,278, filed February 6, 1952 now abandoned, which in turn is a continuation-in-part of application Serial No. 60,416, filed November 16, 1948 now abandoned.

Attempts have been made in the past to improve the properties of many of the homopolymers of the unsaturated monomers by copolymerizing the said monomers with various dissimilar compounds, the homopolymers of which display the desired superior properties. These copolymers have been prepared heretofore by merely mixing the unsaturated compound with the desired dissimilar monomer and then subjecting the resulting mixture to polymerization conditions, such as heat, light and catalysts. When combined under these conditions, the two monomers usually add to the polymer chain in a more or less random fashion and the resulting polymer chains are made up of a very complicated arrangement of the two kinds of monomers. Copolymers prepared from monomers A and B, for example, will have the A and B units arranged in some such order as

ABAABBBABBAABB

This method of producing the desired copolymers is not entirely satisfactory. It has been found, for example, that when the monomer units are distributed throughout the polymers chains in the above-described manner they fail to impart the properties of their corresponding homopolymers and the resulting copolymers in many cases possess an entirely different set of properties. Furthermore, as there is no definite control over the order in which the monomers add to the polymer chain, the copolymers produced by this process rarely, if ever, have the same molecular structure or physical properties and standardization of the copolymers and their applications is quite difficult.

It is, therefore, an object of the invention to provide a new kind of copolymer. It is a further object to provide a new kind of copolymer which possesses many of the characteristic properties of the homopolymers of the individual monomers making up the said copolymer. It is a further object to provide a new type of copolymer having many unusual and beneficial properties. It is a further object to provide internally plasticized polymers of the monomers which generally form hard, brittle homopolymers. It is a further object to provide novel segmented copolymers having unexpected properties as detergents, dispersing agents and the like. It is a further object to provide new segmented copolymers having improved strength. It is a further object to provide new block copolymers having uniform molecular weights. It is a further object to provide new block copolymers free of contaminating homopolymers. These and other objects of the invention will be apparent from the following detailed description thereof.

It has now been discovered that these and other objects may be accomplished by the new block copolymers of the present invention comprising copolymers wherein the macromolecules are made up of at least two different linear segments joined in an end to end arrangement, the first segment being made up of a linear polymer of a member of the group consisting of ethylenically unsaturated carboxylic acids, anhydrides thereof, their esters and amides, and the other segment being made up of a polymer of at least one monomer selected from the group consisting of a dissimilar member of the aforementioned group, esters of unsaturated alcohols and saturated carboxylic acids, alkenes, alkadienes, vinyl halides, vinylidene halides, ethylenically unsaturated nitriles, alkenyl-substituted aromatic hydrocarbons, alkenyl-substituted halo-hydrocarbon and alkenyl ethers. These new block copolymers are prepared by adding a preformed linear polymer of the ethylenically unsaturated carboxylic acid or derivative which has a molecular weight of at least 50,000 to a liquid medium containing the above-described special monomer which is dissimilar to the monomer unit contained in the preformed polymer, and then subjecting the resulting mixture in an inert atmosphere to mechanical agitation to degrade the said preformed polymer. Or alternatively, the inducing polymer may be made up of the monomer needed in the second segment and the monomer to be polymerized may be the unsaturated acid or derivative.

In the presence of the mechanical agitation, the preformed polymer chains are broken to form free radicals, and when the chains are broken in the presence of a polymerizable monomer, that monomer adds to the chains to form a new type block copolymer. The resulting copolymer is thus made up of a segment of the initial preformed polymer joined in an end-to-end arrangement through a carbon-to-carbon linkage to the second segment of polymer made up of units of the monomer employed in the liquid reaction mixture. Such products may be represented, for example, by the structure

AAAAAAAAAAABBBBBBBBBBBB wherein A is the unit of the monomer in the preformed polymer and B is the unit of the monomer in the reaction mixture.

The different molecular structure of the copolymers of the present invention as discussed above endows them with properties which are entirely different from those possessed by the conventional copolymers. As indicated above, the conventional copolymers lose the characteristic properties of the homopolymers of the monomers making up the said copolymers and assume properties which are entirely different. The copolymers of the present invention, on the other hand, retain many of the characteristic properties of the homopolymers of the individual monomers. A copolymer made up of a segment of poly(methyl methacrylate) joined to a segment of poly(methacrylonitrile) produced by the process of the invention will, for example, possess the characteristic properties of both poly(methyl methacrylate) and polymethacrylonitrile.

An important application of the process of the invention is its use in the production of "internally" plasticized polymers, i.e., polymers wherein the plasticizer is joined to the polymer through a primary chemical bond. The production of this type of polymer is accomplished by selecting as the inducing polymer, a polymer which can be softened or plasticized, such as polyvinyl chloride, and using as the added monomer a compound which would ordinarily form soft, plasticizing polymer, such as ethyl acrylate. The resulting product is a polymer that possesses substantially all the desired properties of the hard polymer and the flexibility of the soft, flexible polymer. As the plasticizer is chemically bound in the molecule, there is no danger of its loss through migration or volatilization.

A further advantage is the production of copolymers having improved physical properties, such as improved impact strength. In this case, the initiation polymer may be a polymer deficient in impact strength, and the added monomer may be one which forms softer and more flexible polymer, such as butadiene or isoprene. In this case, the resulting product has greatly improved impact strength but still possesses the advantageous properties of the initial preformed polymer.

A still further important application of the process of the invention is its use in the preparation of polymers having unexpected solution behavior. Polymers having the unexpected property of having solubility in both water and oil may be obtained by the novel process, for example, by employing as the inducing polymer a polymer of a compound having groups that have water soluble characteristics or could be converted to groups having water soluble characteristics, such as vinyl acetate, acrylonitrile, methyl methacrylate, and the like, and then using a hydrocarbon monomer, such as styrene as the unsaturated monomer to be added to the polymer chain. Copolymers prepared in this manner are particularly useful as detergents and as dispersing agents for preparing suspensions and emulsions of various components, such as metal oxides, that will not be precipitated either in aqueous or hydrocarbon systems.

Additional advantage of the process is found in the fact that it may be accomplished in the absence of catalysts and relatively high temperature and yields products of higher quality and more uniform molecular weight.

The copolymers of the present invention are distinguished in structure and properties from the copolymers prepared by forming a prepolymer of a polyethylenically unsaturated monomer, such as piperylene, and then polymerizing another monomer at the remaining unsaturation in the prepolymer molecule. As the unsaturated prepolymer will possess unsaturated linkages in the main chain, such as

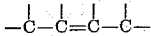

and/or in the side chains, such as

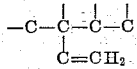

the resulting copolymer will always have the dissimilar monomers adding on at the side of the main polymer chain and the product will be a highly branched copolymer having a structure, such as

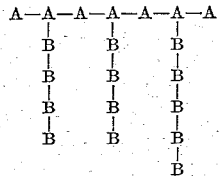

wherein A is the monomer unit derived from the polyunsaturated compound and B is the monomer unit of the dissimilar monomer.

The copolymers prepared from the prepolymers of the polyunsaturated compounds, such as piperylene, as described above, will not have any of the superior properties of the segmented copolymers of the present invention. Such copolymers will have the dissimilar monomers distributed along the main polymer chain and the properties will generally be the same as those of the conventional copolymer which are prepared by mixing the monomers at the beginning of the polymerization. Further, copolymers prepared from the prepolymers of the polyunsaturated compounds will be highly branched and thus have higher viscosity and poorer solubility and compatibility characteristics than the unbranched polymers as shown in the example at the end of the specification.

The preformed polymer to be used in the process of the invention may be any linear polymer of unsaturated monomers as ethylenically unsaturated carboxylic acids, anhydride thereof, their esters and amides. By linear is meant one that is free of cross-linking, i.e. unable to undergo further polymerization with unsaturated monomers when heated in the presence of a peroxide catalyst. As noted above, the preformed polymer undergoes polymerization in the present process by means of free radicals formed when the polymer is broken, and the polymerization is not due to the presence of any unsaturated linkage in the molecule itself.

The above-noted monomers may be exemplified by the following: acrylic acid, methacrylic acid, crotonic acid, chloroacrylic acid, butenoic acid, pentenoic acid, maleic anhydride, fumaric anhydride, chloromaleic anhydride, methyl methacrylate, ethyl methacrylate, ethyl acrylate, butyl acrylate, octyl acrylate, decyl acrylate, isopropyl butenoate, butyl pentenoate, diethyl maleate, dibutyl maleate, dihexyl chloromalate, dicyclohexyl maleate, cyclohexyl acrylate, butyl crotonate, acrylamide, methacrylamide, N-ethyl acrylamide, N-butyl acrylamide, and the like, and mixtures thereof.

Preferred preformed polymers to be used in the process include the linear polymers of unsaturated monomers of the group consisting of alkenoic and alkenedioic acids containing up to 8 carbon atoms, their anhydrides, alkyl esters of the said alkenoic acids and alkendioic acids wherein the esters contain up to 12 carbon atoms, and the amides and N-alkyl amides of the aforedescribed alkenoic acids and alkenedioic acids. Coming under special consideration are the acrylic acids, and especially acrylic acid and methacrylic acids, their alkyl esters and amides.

The preformed polymers of the above described monomers include the homopolymers of the said monomers as well as copolymers and interpolymers of the said monomers as well as copolymers and interpolymers wherein said copolymers and interpolymers contain at least 50% by weight of said monomers. Examples of monomers that can be copolymerized therewith include the monomers described hereinafter for use as monomers in the process of the invention as well as many other known types of ethylenically unsaturated monomers.

The preformed polymers noted above can be produced by any suitable method. They may be produced, for example, by addition reactions, condensation reactions, and the like. The reactions may be energized if desired by light and/or heat and may be accomplished in the presence of any type polymerization catalyst, such as peroxides, peracids, persalts, peresters, metals, inorganic salts, Friedel-Crafts type catalysts and the like. The polymers may be prepared by bulk polymerization, in a solvent solution or in an aqueous emulsion or aqueous suspension. Polymers prepared by a previous operation of the process of the present invention may also be utilized.

The molecular weight of the preformed polymers should be sufficiently high to permit a degradation of the polymer molecule when the said polymer is subjected to the subsequent agitation treatment. The molecular weight of the preformed polymers used in the process of the invention will, therefore, vary over a considerable range depending upon the ease with which the individual polymer may be degraded, the intensity of the agitation treatment, etc. In some cases polymers having molecular weights as low as $5 \times 10^4$ may be used in the process. In other cases polymers having a molecular weight as high as $9 \times 10^6$ or higher may be used. The preferred polymers to be used in the process have molecular weights between $7.5 \times 10^4$ and $7 \times 10^6$. These molecular weights were determined by measuring the intrinsic viscosity of the polymer in solution and calculating the molecular weight as discussed by P. J. Flory in the Journal of the American Chemical Society, 65 372 (1943).

The monomer to be mixed with the above-described preformed polymers include any of the aforementioned monomers used in making the preformed polymer as long as it is dissimilar to the monomer used in making the preformed polymer, and in addition esters of unsaturated alcohols and saturated carboxylic acids, alkenes, alkadienes, vinyl halides, vinylidene halides, ethylenically unsaturated nitriles, alkenyl-substituted hydrocarbons and alkenyl ethers. Examples of these include, among others, vinyl acetate, vinyl propionate, vinyl butyrate, vinyl benzoate, vinyl cyclohexanecarboxylate, allyl acetate, allyl benzoate, ethylene, propylene, butylene, isobutylene, octene, decylene and the like, butadiene, isoprene, methylpentadiene, chloroprene, cyclopentadiene, vinyl chloride, vinylbromide, vinylidene chloride, vinylidene bromide, vinylidene iodide, methacrylonitrile, acrylonitrile, styrene, vinyltoluene, alpha-methylstyrene, 4-chlorostyrene, 2,4-dichlorostyrene, 2,5-dichlorostyrene, 3-tert-butylstyrene, 4-octylstyrene, and the like, vinyl ethyl ether, vinyl butyl ether, vinyl octyl ether, vinyl cyclohexyl ether and the like, and mixtures thereof.

Coming under special consideration, particularly because of the promising properties of the resulting block copolymers as to moldability and the like, are the monomers of the group consisting of alkenyl esters of saturated monocarboxylic acids containing up to 8 carbon atoms, alkenes containing from 2 to 6 carbon atoms, alkadienes containing from 4 to 8 carbon atoms, vinyl chloride, vinylidene chloride, ethylenically unsaturated mononitriles containing up to 6 carbon atoms, and especially acrylonitrile, alkenyl-substituted aromatic hydrocarbons containing up to 14 carbon atoms, and especially the styrenes and alkyl and halo-substituted styrenes containing up to 12 carbon atoms.

As noted above, in case the alternative preparation process is used, the preformed polymer may be prepared as noted above from any of the above-noted monomers and this polymer then combined with the unsaturated acid or derivative as the polymerizable monomer.

In case the monomer is to be added to produce a plasticizing effect on the resulting polymer the ones selected will be those which form polymers which are softer and more flexible than the preformed high molecular weight, linear polymer, such as methyl methacrylate, vinyl acetate, vinyl propionate, vinyl butyrate, methyl acrylate, and the like.

The reaction is generally accomplished in a liquid medium. The monomer or monomers to be polymerized, if liquid, may themselves form the medium or liquids, such as water, organic solvents or diluents, such as benzene, cyclohexane, xylene, hexane, diheptyl ether, and the like, and mixtures thereof may be added to the reaction mixture. In most cases, it is preferred to use only the monomer as the reaction medium and to employ conditions to maintain the monomer in the liquid phase. The medium need not dissolve the polymer, but it has been found that better results are obtained if there is at least a partial dissolution of the polymer.

The quantity of the preformed inducing polymer to be added to the reaction may vary over a considerable range. In most instances, it is desirable to keep the amount of polymer at a relatively low level so that there will be more opportunity for the chains to be spread out and broken near the middle. If the medium becomes too concentrated with respect to the polymer, the polymer chains may become entangled and only those segments sticking out of the bundle may be broken. Preferably the polymer is employed in amounts varying from 0.5 to 10 parts per 100 parts of medium, and more preferably from 0.8 to 5 parts per 100 parts of medium.

The amount of dissimilar monomer to be present in the reaction mixture will also vary over a wide range. If the monomer is employed as the liquid medium for the reaction, the amount of monomer will be relatively large in order to obtain the desired degree of dilution. In that case, the reaction may be stopped as soon as the desired amount of monomer has been added to the polymer chain. In case another reaction medium, such as an inert solvent is employed, the amount of monomer added will depend generally upon the amount of monomer that is to be added to the polymer chains.

Molecular oxygen will inhibit the polymerization reaction and it is usually desirable to remove the oxygen from the reaction chamber before the degradation is commenced. In the case of a few monomers, such as styrene, however, small quantities of oxygen may be tolerated. The removal of the oxygen may be accomplished by any suitable method. It is preferably accomplished by freezing the mixture of preformed polymer and monomer and evacuating the reaction chamber by means of a pump. In some cases it may be desirable to replace the withdrawn oxygen with an inert gas, such as nitrogen, methane, carbon dioxide, and the like.

The process of the invention may be accomplished in the presence or absence of light. As light has an accelerating affect on the polymerization of some types of monomers, it may be desirable in some cases to conduct the reaction in the presence of light in order to increase the polymerization rate.

The agitation treatment applied to the deoxygenated reaction mixture may be any suitable treatment which will apply sufficient strain and tensions on the bonds of the polymer to break the polymer chains. Mechanical treatments, such as shaking, high speed stirring, milling, grinding, gear and piston pumps, passage through filters and capillaries, are satisfactory. The degradation of the preformed polymer is preferably accomplished by passing the reaction mixture through variously designed throttle values, or narrow orifices at high linear velocity. For this purpose an enclosed system and a circulating gear pump or diaphragm pump capable of generating high hydrostatic pressures have proved very satisfactory. Another preferred method comprises subjecting the reaction mixture to high speed stirring, e.g., stirring at the rate of about 4000 r.p.m.

The amount of shear stress to be applied to the reaction mixture will vary over a considerable range depending upon the type of polymer to be broken, e.g., whether it contains —C—C—, —C—S—, —C—O—, —S—S—, etc., bonds, the molecular weight of the polymer, the viscosity of the solution, etc., but it should be at least sufficient to break the linear polymer. The shear stress applied by the usual slight shaking or stirring of the containers in the laboratory is not sufficient to bring about the desired degradation. In general, the minimum shear stress applied to the solution should be that determined by the following formula $$\frac{2 \times 10^{12}}{(M.W.)^2} = \text{dynes/cm}^2$$

wherein M.W. is the molecular weight of the linear polymer. Preferably with polymers having the main chain consisting chiefly of —C—C—, —C—S—, —C—O—, or —S—S— bonds, which polymers are present in amounts varying from 0.5% to 10% by weight of the reactants, the minimum stress should be determined by the formula $$\frac{1 \times 10^2}{(M.W.)^2} = \text{dynes/cm.}^2$$

and more preferably $$\frac{2 \times 10^{15}}{(M.W.)^2} = \text{dynes/cm.}^2$$

wherein M.W. is the molecular weight of the linear polymer. Increasing the shear stress increases the formation of polymer free radicals and this in turn increases the rate of reaction, so faster reaction rates may be obtained by using shear stresses which are in considerable excess of those described above.

The temperature at which the process may be carried out may also vary considerably. In general temperatures ranging from 0° C. to 250° C. have proved satisfactory. Particularly preferred temperatures range between 0° C. and 100° C. Atmospheric, super-atmospheric, or subatmospheric pressures may be used in the process as desired.

The polymers formed in the reaction may be recovered by any suitable means, such as filtration, solvent extraction, dehydration and the like.

The process of the invention may be executed in any convenient type apparatus enabling the maintenance of the proper conditions and the introduction of the various reactants. The process may be carried out in batch, semi-continuous or continuous manner. For large scale production it is preferred to conduct the process in a continuous manner. In such an operation the preformed polymer and monomer or monomers will be continuously added and the polymers continuously removed from the reaction mixture. The operation of the process in a continuous manner is particularly desirable as such an operation presents much more stable conditions and the composition of the resulting polymers are more uniform and of better quality.

As described above, the copolymers produced by the above-described process will be block copolymers, i.e., they are made up of two or more segments of polymers joined in an end to end arrangement, the first segment being made up of the preferred polymer of the alkenyl-substituted aromatic compound and the other segment or segments being made up of the polymer of the added monomer or monomers. The copolymers will have molecular weights ranging from about 10,000 to 750,000 (as determined by the intrinsic viscosity measurements as noted above) depending on intensity of the mechanical agitation. In most cases, the molecular weights of the macromolecules will be substantially uniform due to the tendency of agitation to reduce the macromolecules to the same molecular weight level.

The new copolymers will preferably contain at least 5% by weight of the alkenyl-substituted aromatic compound, and preferably from 5% to 99% by weight of the said material. On a macromolecular structural basis, the molecules should preferably contain at least 5 units of the alkenyl-substituted aromatic compound and at least 5 units of the dissimilar monomer.

The block copolymers of the invention may be used for a variety of applications. They will be hard solid materials which can generally be molded or extruded to form attractive plastic articles. They may also be milled, machined, cut or otherwise formed into articles, such as buttons, table tops, containers and the like. In the molten or solvent solution the polymers may be utilized in the preparation of impregnating agents, laminating agents, surface coatings and the like. They may also be subjected to extrusion and to injection and compression molding in the presence or absence of added diluents and plasticizers.

To illustrate the manner in which the invention may be carried out the following examples are given. It is to be understood, however, that the examples are for the purpose of illustration and the invention is not to be regarded as limited to any of the specific conditions cited therein.

The deoxygenation of the preformed polymer-monomer mixture in the following examples was accomplished by freezing the said mixture in liquid nitrogen, evacuating on an oil pump, melting, and repeating the step three more times.

The apparatus used for shaking the reaction mixture in the examples below consisted of a cylindrical glass vessel (5.08 cm. in diameter and 12.7 cm. in length) joined on one side to a vertical spring-loaded rod that was in sliding contact with a cam eccentrically mounted on the shaft of an electric motor. When the motor was on, the vessel containing the reaction mixture moved back and forth through a distance of 11.5 cm.

In some of the examples cited below the polymerization has been conducted in the absence of light. This precaution was taken merely to indicate that the polymerization taking place in the reaction mixture was not due to any accelerating affect of light.

*Example I*

About 10 parts of polymethyl methacrylate having a molecular weight of $8.7 \times 10^6$ were added to 2500 parts of methacrylonitrile and the mixture deoxygenated. Tubes containing the mixture were sealed in vacuo and a stress of about 500 dynes/cm.² applied to the mixture by shaking as noted in Example I at the rate of about 300 strokes a minute. This reaction required a much more vigorous shaking as the methacrylonitrile was a relatively poor solvent for polymethyl methacrylate. The resulting product was 72.4 parts of a copolymer made up of a segment of polymethyl methacrylate joined in an end to end arrangement to a segment of polymethacronitrile. No homopolymer of methacrylonitrile was detected.

The above process was repeated using 2500 parts of acrylonitrile in place of methacrylonitrile. In this case, the product was identified as a block copolymer made up of a segment of polymethyl methacrylate joined to a segment of polyacrylonitrile. No acrylonitrile homopolymer was detected.

*Example II*

About 10 parts of polymethyl methacrylate having a molecular weight of $8.7 \times 10^6$ were added to 2500 parts of styrene and the mixture deoxygenated. Tubes containing the mixture were sealed in vacuo, and then shaken at 330 strokes a minute at room temperature. The resulting product was 65 parts of a copolymer made up of a segment of polymethyl methacrylate joined in an end to end arrangement to a segment of polystyrene. No homopolymer of styrene was detected.

*Example III*

This example illustrates how the reverse procedure may be used to make the new block copolymers, i.e. by starting with a polymer of the second monomer and breaking it in the presence of an acrylic ester monomer.

About 6 parts of polystyrene having a molecular weight of $6.33 \times 10^6$ were added to 1500 parts of methyl acrylate and 1500 parts of toluene. Tubes containing the mixture were sealed in vacuo, darkened, and then shaken at 330 strokes a minute at room temperature. After about 120 hours of shaking, 130 parts of a copolymer made up of a segment of polystyrene joined in an end to end arrangement with a segment of polymethyl acrylate were obtained. This block copolymer can be molded to form an attractive molded article.

*Example IV*

About 50 parts of polymethyl methacrylate having a molecular weight of about $7.2 \times 10^6$ were mixed with 200 parts of vinyl chloride, and the mixture deoxygenated. Tubes containing the mixture were sealed in vacuo, darkened, and shaken at 330 strokes a minute at room temperature. At the end of 8 days of shaking, 215 parts of a solid copolymer comprising 50 parts of polymethyl methacrylate joined in an end to end arrangement to 50 parts of polyvinyl chloride were obtained.

The copolymer possesses many of the physical and chemical properties of polyvinyl chloride alone, and can be processed without the addition of any plasticizer to form flexible products.

*Example V*

About 50 parts of polymethyl acrylate prepared by polymerizing 1 volume of monomer per 3 volumes of water containing .3% sodium lauryl sulfate and no catalyst (molecular weight approximately 500,000) were added to 2100 parts of vinyl chloride and the mixture deoxygenated. Tubes containing the mixture were sealed in vacuo and shaken at 330 strokes a minute at room temperature. 420 parts of a block copolymer made up of a segment of polymethyl acrylate joined in an end to end arrangement with a segment of polyvinyl chloride were obtained. The copolymer can be molded to form an attractive plastic article.

The above process was repeated using 2100 parts of acrylonitrile in place of the vinyl chloride. In this case, the resulting product was a polymer comprising a segment of polymethyl acrylate joined to a segment of polyacrylonitrile.

*Example VI*

10 parts of the block copolymer of polymethyl methacrylate and polystyrene prepared in Example II are added to 2500 parts of acrylonitrile and the mixture deoxygenated. Tubes containing the mixture are shaken at about 500 strokes a minute at room temperature. After several days of shaking, the tubes are opened and the copolymer recovered. Analysis indicates the product is a block copolymer of a segment of poly(methylmethacrylate polystyrene) joined to a segment of polyacrylonitrile.

*Example VII*

10 parts of polymethyl methacrylate having a molecular weight of $8.7 \times 10^6$ were added to a mixture of 500 parts acrylonitrile and 500 parts of vinylidene chloride. The resulting mixture is deoxygenated and shaken at 330 strokes a minute at room temperature. After several days, the tubes are opened and the copolymer recovered. The resulting product is an interpolymer containing a segment of polymethyl methacrylate joined in an end to end arrangement to a segment of a copolymer of acrylonitrile and vinylidene chloride.

The above process is repeated using a polymethyl acrylate having a molecular weight of $8 \times 10^6$. Related results are obtained.

*Example VIII*

About 0.20 part of polymethyl methacrylate having a molecular weight of $8.7 \times 10^6$ was mixed with 20 parts of vinylidene chloride and the mixture deoxygenated and shaken at room temperature for one week at 330 strokes a minute. At that time, the tubes were opened and the copolymer removed. The resulting product had a weight of 2.85 parts and was identified as a block copolymer made up of a segment of polymethyl methacrylate joined to polyvinylidene chloride. This product can be molded to form attractive plastic articles.

*Example IX*

About 0.20 part of polymethyl acrylate having a molecular weight of about $5 \times 10^5$ was mixed with 20 parts of vinylidene chloride and the mixture deoxygenated and shaken at room temperature for one week at 330 strokes a minute. At that time, the tubes were opened and the copolymer removed. The resulting product had a weight of 0.79 part and was identified as a block copolymer made up of a segment of polymethyl acrylate joined to polyvinylidene chloride. This product can also be molded to form a plastic article.

*Example X*

About 10 parts of polyisobutylene having a molecular weight of $2.2 \times 10^6$ prepared with a Friedel-Crafts catalyst are added to 2000 parts of methyl acrylate and the mixture deoxygenated. Tubes containing the mixture are sealed in vacuo, darkened, and shaken at 330 strokes a minute at room temperature. After one week of shaking, the unreacted monomer was removed and the copolymer recovered. The resulting product is identified as a block copolymer made up of a segment of polyisobutylene joined in an end to end arrangement with a segment of polymethyl acrylate.

The above process is repeated using a linear polypropylene having a molecular weight of about $6 \times 10^5$. Related results are obtained.

*Example XI*

About 10 parts of polymethyl methacrylate having a molecular weight of about $7 \times 10^6$ are added to 2000 parts of vinyl acetate and 1000 parts of cyclohexane and the resulting mixture deoxygenated. The mixture is then repeatedly passed through a narrow orifice having a diameter between 0.005 in. to 0.01 in. at a pressure of about 1000 p.s.i. At the end of 30 hours, the unreacted monomer and solvent are removed and the copolymer recovered. The product is identified as a block copolymer made up of a segment of polymethyl methacrylate joined in an end to end arrangement with a polymer of vinyl acetate. This copolymer can be molded to form an attractive plastic article.

The above process is repeated using each of the monomers in place of the vinyl acetate: vinyl propionate, vinyl butyrate, vinyl benzoate and vinyl cyclohexanecarboxylate. Related results are obtained.

*Example XII*

About 10 parts of polymethyl acrylate having a molecular weight of $8 \times 10^6$ are added to 1000 parts of butadiene and the mixture deoxygenated. The mixture is then shaken in a tube at 330 strokes a minute at room temperature. After several days, the tube is opened and the unreacted monomer removed. The resulting product is identified as a block copolymer of a segment of polymethyl acrylate joined to a segment of polybutadiene.

Related results are obtained by replacing the butadiene with isoprene.

*Example XIII*

About 20 parts of poly(vinyl butyl ether) having a molecular weight of $8.7 \times 10^6$ are added to a mixture containing 200 parts of methyl methacrylate and 500 parts of cyclohexanone. The mixture is deoxygenated and sealed in tubes. The tube is shaken at 330 strokes a minute at room temperature for several days. The resulting product is a block copolymer of a segment of polymethyl methacrylate joined to a segment of polyvinyl butyl ether.

Related results are obtained by replacing the polymer of vinyl butyl ether in the above-described process with polymers of each of the following: vinyl ethyl ether, vinyl isopropyl ether and vinyl isobutyl ether.

*Example XIV*

Examples I, II, III and VI are repeated with the exception that a polymer of ethyl acrylate is used as the initiating polymer. Related results are obtained.

*Example XV*

Examples I, II, III and VI are repeated with the exception that a high mol weight polymer of butyl acrylate is used as the initiating polymer. Related results are obtained.

*Example XVI*

Examples I, II, III and VI are repeated with the exception that a high mol weight polymer of diethyl maleate is used as the initiating polymer. Related results are obtained.

*Example XVII*

About 10 parts of a high molecular weight polyacrylic acid are added to 1000 parts of acrylonitrile and the mixture deoxygenated. The mixture is then shaken in a tube at 330 strokes a minute at room temperature. After several days, the tube is opened and the unreacted monomer removed. The resulting product is a block copolymer of polyacrylic acid and polyacrylonitrile.

Related results are obtained by replacing the acrylonitrile with vinyl acetate.

Related results are also obtained by using a polymer of maleic anhydride as the initiating polymer.

*Example XVIII*

About 10 parts of a polymer of N-methyl acrylamide having a molecular weight of $5 \times 10^5$ are added to 1000 parts of vinyl acetate and the mixture deoxygenated. The mixture is then shaken in a tube at 330 strokes a minute at room temperature. After several days, the tube is opened and the unreacted monomer removed. The resulting product is a block copolymer of poly(N-methyl acrylamide) and polyvinyl acetate.

I claim as my invention:

1. A new type of copolymer wherein the macromolecules are made up of at least two different linear segments joined in an end to end arrangement, the first segment being a linear polymer of a member of the group consisting of ethylenically unsaturated monocarboxylic and dicarboxylic acids containing up to 8 carbon atoms, anhydrides thereof, their esters and amides, and the other segment being a polymer of at least one monomer selected from the group consisting of a dissimilar member of the aforementioned group of monomers, esters of unsaturated alcohols and saturated carboxylic acids, alkenes, alkadienes, vinyl halides, vinylidene halides, ethylenically unsaturated nitriles, alkenyl-substituted aromatic hydrocarbons and alkenyl ethers.

2. A block copolymer made up of two different linear polymer segments joined in an end to end arrangement, the first segment being a linear polymer of an alkyl ester of an acrylic acid and the second segment being a polymer of a vinyl halide.

3. A block copolymer made up of two different linear polymer segments joined in an end to end arrangement, the first segment being a linear polymer of an alkyl ester of an acrylic acid and the second segment being a polymer of an alkenyl-substituted aromatic compound.

4. A block copolymer made up of two different linear polymer segments joined in an end to end arrangement, the first segment being a linear polymer of an alkyl ester of an acrylic acid and the second segment being a polymer of an alkenyl ester of a monocarboxylic acid.

5. A block copolymer made up of two different linear polymer segments joined in an end to end arrangement, the first segment being a linear polymer of an alkyl ester of an acrylic acid and the second segment being a polymer of a diolefin.

6. A block copolymer made up of two different linear polymer segments joined in an end to end arrangement, the first segment being a linear polymer of an alkyl ester of an acrylic acid and the second segment being a polymer of an alkene containing up to 8 carbon atoms.

7. A block copolymer made up of two different linear polymer segments joined in an end to end arrangement, the first segment being a polymer of an alkyl acrylate and the second segment being a polymer of vinylidene chloride.

8. A block copolymer made up of two different linear polymer segments joined in an end to end arrangement, the first segment being a linear polymer of an alkyl ester of methacrylic acid and the second segment being a polymer of acrylonitrile.

9. A block copolymer made up of two different linear polymer segments joined in an end to end arrangement, the first segment being a linear polymer of an alkyl ester of methacrylic acid and the second segment being a polymer of styrene.

10. A block copolymer made up of two different linear polymer segments joined in an end to end arrangement, the first segment being a linear polymer of methyl acrylate and the second segment being a polymer of vinyl chloride.

11. A block copolymer made up of two different linear polymer segments joined in an end to end arrangement, the first segment being a linear polymer of methyl acrylate and the second segment being a polymer of a vinyl ester of a monocarboxylic acid.

12. A block copolymer made up of two different linear polymer segments joined in an end to end arrangement, the first segment being a linear polymer of an acrylic acid, and the second segment being a polymer of a vinyl ester of a saturated monocarboxylic acid.

13. A block copolymer made up of two different linear polymer segments joined in an end to end arrangement, the first segment being a linear polymer of methyl acrylate, and the second segment being a polymer of a monomer of the group consisting of esters of unsaturated alcohols and saturated carboxylic acids, alkenes, alkadienes, vinyl halides, vinylidene halides, ethylenically unsaturated nitriles, alkenyl-substituted aromatic hydrocarbons and alkenyl ethers.

References Cited by the Examiner

UNITED STATES PATENTS

| | | | |
|---|---|---|---|
| 2,123,599 | 7/38 | Fikentscher et al. | 260—17 |
| 2,317,859 | 4/43 | Soday | 260—880 |
| 2,338,741 | 1/44 | Soday | 260—880 |
| 2,538,779 | 1/51 | Harrison et al. | 260—879 |
| 2,991,269 | 7/61 | Nozaki | 260—4 |

MURRAY TILLMAN, *Primary Examiner.*

WILLIAM H. SHORT, JAMES A. SEIDLECK,
*Examiners.*